(12) United States Patent
Dohi

(10) Patent No.: US 7,565,570 B2
(45) Date of Patent: Jul. 21, 2009

(54) DISK ARRAY DEVICE AND PATH FAILURE DETECTION METHOD THEREOF

(75) Inventor: Hironori Dohi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 483 days.

(21) Appl. No.: 11/293,176

(22) Filed: Dec. 5, 2005

(65) Prior Publication Data

US 2007/0168705 A1 Jul. 19, 2007

(30) Foreign Application Priority Data

Nov. 7, 2005 (JP) ............................. 2005-322437

(51) Int. Cl.
*G06F 11/00* (2006.01)
(52) U.S. Cl. ................... 714/6; 714/5; 711/113
(58) Field of Classification Search ............ 714/6
See application file for complete search history.

(56) References Cited

U.S. PATENT DOCUMENTS

| | | | | |
|---|---|---|---|---|
| 6,505,311 B1 * | 1/2003 | Ichinohe et al. | ............... | 714/56 |
| 6,970,972 B2 * | 11/2005 | Hosoya | ............... | 711/113 |
| 7,076,688 B2 * | 7/2006 | Yamamoto | ............... | 714/6 |
| 2004/0003338 A1 * | 1/2004 | Kostoff et al. | ............... | 714/776 |
| 2004/0139365 A1 * | 7/2004 | Hosoya | ............... | 714/5 |
| 2005/0268145 A1 * | 12/2005 | Hufferd et al. | ............... | 714/2 |
| 2006/0212719 A1 * | 9/2006 | Miyawaki et al. | ............ | 713/189 |
| 2007/0260911 A1 * | 11/2007 | Marilly et al. | ................. | 714/4 |

FOREIGN PATENT DOCUMENTS

JP 2003-188876 7/2003

* cited by examiner

*Primary Examiner*—Scott T Baderman
*Assistant Examiner*—Kamini Patel
(74) *Attorney, Agent, or Firm*—Brundidge & Stanger, P.C.

(57) ABSTRACT

This disk array device includes a first control unit connected to a host system via a first path through which data is transmitted and received, a second control unit connected to the host system via a second path through which data is transmitted and received upon a failure, a memory storing control information, and a storage apparatus storing data transmitted from the host system; wherein the first control unit controls the transmission and reception of data between the host system and the storage apparatus conducted via the first path, and stores the control information used in the communication with the host system in the memory; and wherein the second control unit has a transmission unit for transmitting a command to the host system via the second path based on the control information used in the communication stored in the memory, and a determination unit for determining whether a failure occurred in the communication between the second control unit and the host system based on a response to the command.

16 Claims, 8 Drawing Sheets

| Byte | +0 | +1 | +2 | +3 | +4 | +5 | +6 | +7 |
|---|---|---|---|---|---|---|---|---|
| 1 | NAS CONTROLLER NUMBER | | | | NETWORK PORT NUMBER | | | |
| 2 | IP ADDRESS (FIRST BYTE) | | | | | | | |
| 3 | IP ADDRESS (SECOND BYTE) | | | | | | | |
| 4 | IP ADDRESS (THIRD BYTE) | | | | | | | |
| 5 | IP ADDRESS (FOURTH BYTE) | | | | | | | |
| 6 | MAC ADDRESS (FIRST BYTE) | | | | | | | |
| 7 | MAC ADDRESS (SECOND BYTE) | | | | | | | |
| 8 | MAC ADDRESS (THIRD BYTE) | | | | | | | |
| 9 | MAC ADDRESS (FOURTH BYTE) | | | | | | | |
| 10 | MAC ADDRESS (FIFTH BYTE) | | | | | | | |
| 11 | MAC ADDRESS (SIXTH BYTE) | | | | | | | |
| 12 | HOST ACCESS FLAG | | | | | | | |

DISK ARRAY DEVICE AND PATH FAILURE DETECTION METHOD THEREOF

CROSS-REFERENCES TO RELATED APPLICATIONS

This application relates to and claims priority from Japanese Patent Application No. 2005-322437, filed on Nov. 7, 2005, the entire disclosure of which is incorporated herein by reference.

BACKGROUND OF THE INVENTION

The present invention relates to a disk array device connected to a host system via network equipment such as a switch device, and to a path failure detection method thereof.

Conventionally, a storage system which, by connecting a plurality of host systems and a plurality of disk array devices via network equipment such as a switch device, transmits an access request from a host system to a disk array device via network equipment, stores data in a physical disk of the disk array device according to an access request in such disk array device, or reads data from the physical disk is becoming widely prevalent.

Here, for instance, a path failure between the host system and disk array device is detected by issuing a path check command from the host system to the disk array device, or connecting a network monitoring device between the host system and disk array device.

As a method for detecting this kind of path failure, proposed is a network monitoring device that estimates the failure location based on the notice of the occurrence of failure on a logical path and/or physical path on a network, outputs failure information including identification of the network relating to the failure, and outputs an index of the degree of influence corresponding to the failure location by associating it with the identification of the network together with the output of failure information (e.g., refer to Japanese Patent Application No. 2003-188876).

SUMMARY OF THE INVENTION

With the conventional method of detecting a path failure, a path check command is issued from a host system to a disk array device, and whether or not a path failure occurred is detected based on a response from the disk array device to the path check command. Thus, the host system is required to issue the path check command, confirm the response from the disk array device, manage information regarding whether there is a path failure, notify the administrator upon the occurrence of a path failure and other matters, and, as a result, the processing load of the host system will be significant. When the host system is not to check the path failure, it is necessary to check the path failure separately with a network monitoring device.

Further, in a storage system, as a measure against path failure, a system is employed where an alternate path to be used upon a path failure in the notification path is prepared in addition to a normal path to be used during normal use, and the path is switched from the normal path to the alternate path when a path failure occurs in the normal path in order to continue receiving data from the host system or transmitting data to the host system.

Nevertheless, with the conventional method of detecting a path failure, although it is possible to detect a path failure in the normal path since a path check command is issued from the host system to the disk array device, a path failure in the alternate path cannot be detected since it is not possible to access in advance the alternate path that is switched from the normal path upon a failure. Thus, when a path failure occurs in the alternate path, this will mean that a path failure is occurring in both the normal path and alternate path when the path is switched from the normal path to the alternate path. As a result, there is problem in that the reception of data from the host system or the transmission of data to the host system will be stopped.

The present invention was devised in view of the foregoing problems, and an object thereof is to provide a highly reliable disk array device capable of effectively preventing a path failure from occurring, and a path failure detection method thereof.

In order to achieve the foregoing object, the present invention provides a disk array device including a control unit connected to a host system via a path, a memory for storing control information, and a storage apparatus storing data transmitted from the host system; wherein the memory stores control information used in the communication with the host system; and wherein the control unit has a transmission unit for controlling the transmission and reception of data between the host system and the storage apparatus conducted via the path and transmitting a command to the host system via the path based on the control information used in the communication stored in the memory, and a determination unit for determining whether a failure occurred in the communication between the host system and the control unit based on a response to the command.

Accordingly, since it will be possible to check whether a failure occurred in the communication path with the disk array device, the processing load burden on the host system for checking the path failure can be reduced without have to separately provide a network monitoring device. Incidentally, as the control information used in the communication with the host system described above, for instance, a host information table HT described later may be used.

Further, the present invention also provides a disk array device including a first control unit connected to a host system via a first path through which data is transmitted and received, a second control unit connected to the host system via a second path through which data is transmitted and received upon a failure, a memory storing control information, and a storage apparatus storing data transmitted from the host system; wherein the first control unit controls the transmission and reception of data between the host system and the storage apparatus conducted via the first path, and stores the control information used in the communication with the host system in the memory; and wherein the second control unit has a transmission unit for transmitting a command to the host system via the second path based on the control information used in the communication stored in the memory, and a determination unit for determining whether a failure occurred in the communication between the second control unit and the host system based on a response to the command.

Accordingly, since it is possible to check in advance whether data can be transmitted and received to and from the host system via the alternate path, when the normal path is switched to the alternate path upon a failure, it will be possible to effectively prevent a situation of not being able to transmit and receive data to and from the host system via the alternate path from occurring.

Further, the present invention also provides a disk array device including a first control unit connected to a switch device connected to a host system via a first path through which data is transmitted and received, a second control unit connected to the switch device via a second path through which data is transmitted and received upon a failure, a memory for storing control information, and a storage apparatus for storing data transmitted from the host system; wherein the second control unit has a transmission unit for transmitting a first command to the first control unit via the second path and the switch device and the first path, and a determination unit for determining that a failure has not occurred in the communication between the second control unit and the switch device when there is a response to the first command.

Accordingly, since it is possible to check in advance whether data can be transmitted and received to and from the host system via the alternate path, when the normal path is switched to the alternate path upon a failure, it will be possible to effectively prevent a situation of not being able to transmit and receive data to and from the host system via the alternate path from occurring.

According to the present invention, since the disk array device is able to check a path failure by storing control information used in the communication with the host system in a memory and transmitting a path check command to the host system based on the control information stored in the memory, the processing load burden on the host system for checking the path failure can be reduced without have to separately provide a network monitoring device.

DETAILED DESCRIPTION OF THE INVENTION

An embodiment of the present invention is now described in detail with reference to the drawings.

(1) Configuration of Storage System According to Present Embodiment

Figure 1:
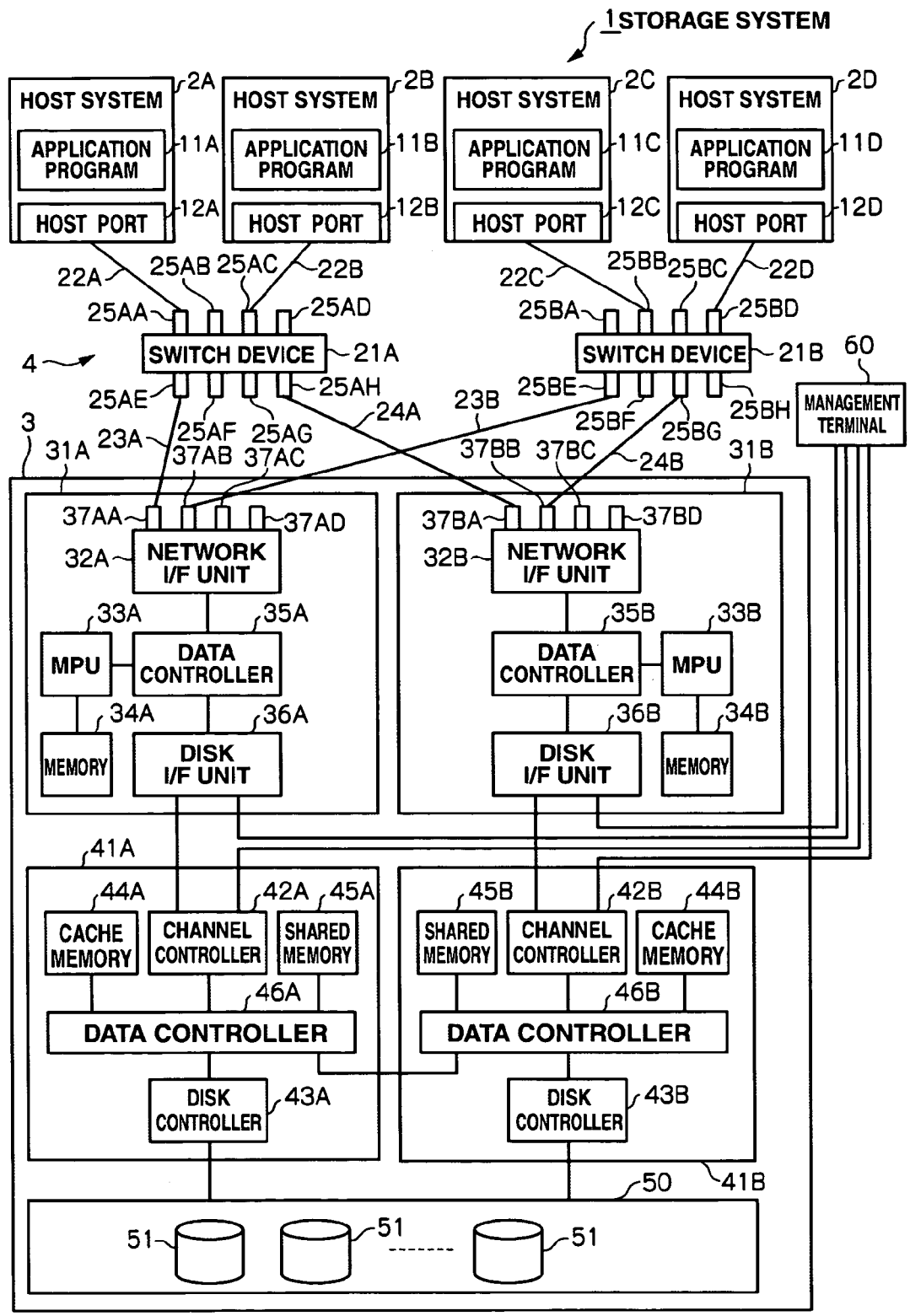
FIG. 1 is a schematic diagram showing the configuration of a storage system according to the present embodiment.

FIG. 1 shows the system configuration of a storage system 1 according to the present embodiment. This storage system 1 is configured by having a plurality of host systems 2 (2A to 2D) and a disk array device 3, and the host systems 2 being connected to the disk array device 3 via a network 4.

Each host system 2, for instance, is a host system having the likes of a CPU (Central Processing Unit) and memory, and specifically is a personal computer, workstation, mainframe computer or the like. Further, each host system 2, for example, is equipped with application programs 11 (11A to 11D), and host ports 12 (12A to 12D) for accessing the disk array device 3 via the network 4. Here, the application program 11, for instance, is an application program of a database or the like using a storage resource provided by the disk array device 3, or a management application program for managing the storage resource.

The network 4, for example, is configured by a plurality of host systems 2 being connected to a plurality of switch devices 21 (21A, 21B), and the switch devices 21 (21A, 21B) being connected to the disk array device 3.

Here, the network 4 is configured by including switch devices 21 (21A, 21B); connection paths 22 (22A to 22D) for connecting the host systems 2 (2A to 2D) and the switch devices 21 (21A, 21B); normal paths 23 (23A, 23B) for transmitting and receiving data during normal use; and alternate paths 24 (24A, 24B) for connecting the switch devices 21 (21A, 21B) and the disk array device 3 and transmitting and receiving data when a failure occurs in the normal paths 23 (23A, 23B).

The switch devices 21 (21A, 21B) are configured by including a plurality of switch ports 25 (25A(25AA to 25AH), 25B (25BA to 25BH)). Here, the host port 12A and switch port 25AA are connected via a connection path 22A, the host port 12B and switch port 25AC are connected via a connection path 22B, the host port 12C and switch port 25BB are connected via a connection path 22C, and the host port 12D and switch port 25BD are connected via connection path 22D.

Incidentally, as the network 4, for example, a LAN (Local Area Network), SAN (Storage Area Network), Internet, dedicated line, public line or the like may be suitably used. When the host system 2 is to be connected to the disk array device 3 via a LAN, it designates a file name and transmits and receives data in file units according to a TCP/IP (Transmission Control Protocol/Internet Protocol) protocol, and, when it is connected to the disk array device 3 via a SAN, it transmits data in block units, which is a data management unit of the storage resource provided by a plurality of hard disks, according to a fibre channel protocol.

Further, the host port 12, for instance, is a LAN-compatible network card when the network 4 is a LAN, and, for example, is an HBA (Host Bus Adapter) when the network 4 is a SAN. Further, the switch device 21, for instance, is a LAN switch when the network 4 is a LAN, and, for example, is a fibre channel switch when the network 4 is a SAN.

The disk array device 3 is configured by including NAS (Network Attached Storage) controllers 31 (31A, 31B), disk controllers 41 (41A, 41B) and a storage apparatus 51.

The NAS controllers 31A, 31B are configured by including network I/F (interface) units 32 (32A, 32B), MPUs (Micro Processing Units) 33 (33A, 33B), memories 34 (34A, 34B), disk I/F units 35 (35A, 35B) and data controllers 36 (36A, 36B).

The network I/F units 32A, 32B, for instance, are configured from a prescribed communication interface or the like, and configured by including a plurality of network ports 37 (37A (37AA to 37AD), 37B (37BA to 37BD)) for accessing the switch devices 21A, 21B. Here, the switch port 25AE and network port 37AA are connected via a normal path 23A, the switch port 25BE and network port 37AB are connected via a normal path 23B, the switch port 25AH and network port 37BA are connected via an alternate path 24A, and the switch port 25BG and network port 37BB are connected via an alternate path 24B.

The memories 34A, 34B are storage memories used by the MPUs 33A, 33B and, for example, store NAS control information for controlling the disk array device 3 as NAS. And, the MPUs 33A, 33B control the disk array device 3 as NAS according to the NAS control information stored in the memories 34A, 34B.

The data controllers 35A, 35B, for instance, are configured from a switch such as a crossbar switch or a bus for performing data transmission via high-speed switching, are connected to the MPUs 33A, 33B, network I/F units 32A, 32B and disk I/F units 36A, 36B, and transfer the data write request, data read request, data to be written and data to be read among the MPUs 33A, 33B, network I/F units 32A, 32B and disk I/F units 36A, 36B.

The disk I/F units 36A, 36B, for example, are configured from a prescribed communication interface or the like, and are connected respectively to the management terminal 60 and disk controllers 41A, 41B.

The management terminal 60 is a terminal device for maintaining or managing the NAS controllers 31A, 31B and disk controllers 41A, 41B. A user of the management terminal 60, by operating the management terminal 60, for example, will be able to set a logical volume defined on a hard disk 51 described later, add or remove the hard disk 51, change the setting of the RAID configuration (e.g., change the setting from RAID level 5 to RAID level 1), and so on.

The disk controllers 41 (41A, 41B) are configured by including channel controller 42s (42A, 42B), disk controllers 43 (43A, 43B), cache memories 44 (44A, 44B), shared memories 45 (45A, 45B) and data controllers 46 (46A, 46B).

The channel controllers 42A, 42B, for example, are configured as a microcomputer system respectively including a microprocessor (not shown), internal memory (not shown) and a communication interface, and assigned a network address (e.g., MAC (Media Access Control) address, WWN (World Wide Name), IP (Internet Protocol) address) for identifying the respective channel controllers. Further, the channel controllers 42A, 42B are respectively connected to the management terminal 60.

The data controllers 46A, 46B, for instance, are configured from a switch such as a crossbar switch or a bus for performing data transmission via high-speed switching, are connected to the channel controllers 42A, 42B, disk controllers 43A, 43B, cache memories 44A, 44B and shared memories 45A, 45B, and transfer the data write request, data read request, data to be written and data to be read among the channel controllers 42A, 42B, disk controllers 43A, 43B, cache memories 44A, 44B and shared memories 45A, 45B.

Further, the data controllers 46A, 46B are communicably connected to the other data controllers 46A, 46B, and transfer the data write request, data read request, data to be written and data to be read to and from the other data controllers 46A, 46B.

The cache memories 44A, 44B and shared memories 45A, 45B are storage memories to be shared by the channel controllers 42A, 42B and disk controllers 43A, 43B. The cache memories 44A, 44B, for example, are capable of temporarily storing the data to be written or data to be read. The shared memories 45A, 45B, for instance, store management information for managing the data to be written and data to be read stored in the hard disk 51 and control information to be used by a program or the like, and are capable of temporarily storing the data write request and data read request.

The disk controllers 43A, 43B, for example, are configured as a microcomputer system respectively including the likes of a microprocessor (not shown) and internal memory (not shown), and execute processing of writing data in the hard disk 51 and reading data from the hard disk 51 according to the data write request and data read request stored in the shared memories 45A, 45B.

Here, the disk controllers 43A, 43B are capable of controlling the hard disk 51 according to a RAID level (e.g., RAID 1, RAID 5, etc.) prescribed with a so-called RAID (Redundant Array of Inexpensive Disks) system.

The storage apparatus 50 is configured from a plurality of hard disks 51 arranged in an array. This hard disk 51, for instance, is configured from an ATA (Advanced Technology Attachment) hard disk, SATA (Serial-ATA) hard disk, SCSI (Small Computer System Interface) hard disk, SAS (Serial Attached SCSI) hard disk, fibre channel hard disk or the like.

And, for example, a group (RAID group or the like) operated under a RAID system is configured by combining a plurality of these hard disks 51, and one or more logical volumes (hereinafter referred to as a logical volume) can be set in the storage area provided by the foregoing group.

Here, the flow of transmitting and receiving data between the host system 2 and disk array device 3 in the storage system 1 is explained. Incidentally, in the following explanation, the NAS controller 31A connected to the normal path 23 is referred to as a normal path-side NAS controller [31A], and the NAS controller 31B connected to the alternate path 24 is referred to as an alternate path-side NAS controller 31B. Moreover, in the following explanation, the disk controller 41A connected to the normal path-side NAS controller 31A is referred to as a normal path-side disk controller 41A, and the disk controller 41B connected to the alternate path-side NAS controller 31B is referred to as an alternate path-side disk controller 41B.

When an order to write data in the hard disk 51 of the disk array device 3 is given based on the user's operation, the host system 2 transmits a corresponding data write request and data to be written to the network I/F unit 32A of the normal path-side NAS controller 31A via the host port 12, connection path 22, switch ports 25A to 25D, switch device 21, switch ports 25E to 25H, normal path 23 and network port 37A, respectively.

When the network I/F unit 32A receives the data write request and data to be written, the MPU 33A of the normal path-side NAS controller 31A converts the data write request and data to be written in file units into a data write request and data to be written in prescribed block units, and transmits such data write request and data to be written to the channel controller 42A of the normal path-side disk controller 41A via the data controller 35A and disk I/F unit 36A.

When the channel controller 42A receives the data write request and data to be written, it writes the data write request in the shared memory 45A via the data controller 46A, and writes the data to be written in the cache memory 44A via the data controller 46A.

The disk controller 43A is constantly monitoring the shared memory 45A, and, when it detects that the data write request has been written in the shared memory 45A, it converts the data write request designated by a logical address in block units into a data write request designated by a physical address, reads the data to be written from the cache memory 44A, writes this in the address position of the corresponding hard disk 51 of the storage apparatus 50 according to the data write request, creates a data write request complete command, and transmits this data write request complete command to the host system 2 that transmitted the data write request.

Meanwhile, when an order to read data stored in the hard disk 51 of the disk array device 3 is given based on the user's operation, the host system 2 transmits a corresponding data read request to the network I/F unit 32A of the normal path-side NAS controller 31A via the host port 12, connection path 22, switch ports 25A to 25D, switch device 21, switch ports 25E to 25H, normal path 23 and network port 37A, respectively.

When the network I/F unit 32A receives the data read request, the MPU 33A of the normal path-side NAS controller 31A converts the data read request in file units into a data read request in prescribed block units, and transmits this data read request to the channel controller 42A of the normal path-side disk controller 41A via the data controller 35A and disk I/F unit 36A.

When the channel controller 42A receives the data read request, it writes this data read request in the shared memory 45A via the data controller 46A.

The disk controller 43A is constantly monitoring the shared memory 45A, and, when it detects that the data read request has been written in the shared memory 45A, it converts the data read request designated by a logical address in block units into a data read request designated by a physical address, reads the data to be read designated from the address position of the corresponding hard disk 51 of the storage apparatus 50 based on this physical address, writes the data to be read from this hard disk 51 in the cache memory 44A, creates a data read request complete command, and writes this data read request complete command in the shared memory 45A.

Here, the channel controller 42A is constantly monitoring the shared memory 45A, and, when it detects that the data read request complete command has been written in the shared memory 45A, it reads the data to be read from the cache memory 44A according to the data read request, reads the data read request and data read request complete command from the shared memory 45A, and transmits these to the disk I/F unit 36A of the normal path-side NAS controller 31A.

When the disk I/F unit 36A receives the data read request, data to be read and data read request complete command, the MPU 33A of the normal path-side NAS controller 31A converts the data read request, data to be read and data read request complete command in block units into a data read request, data to be read and data read request complete command in file units, transmits, according to the data read request, the data to be read to the host system 2 that transmitted the read request via the data controller 36A, network I/F unit 32A, network port 37A, normal path 23, switch ports 25E to 25H, switch device 21, switch ports 25A to 25D, connection path 22 and host port 12, respectively, and transmits the data read request complete command to the host system 2.

Meanwhile, when the MPU 33A of the normal path-side NAS controller 31A detects the occurrence of a failure, it creates a failure occurrence command, and transmits this failure occurrence command to the MPU 33B of the alternate path-side NAS controller 31B via the data controller 35A, disk I/F unit 36A, channel controller 42A, data controller 46A, data controller 46B, channel controller 42B, disk I/F unit 36B and data controller 35B, respectively.

When the MPU 33B of the alternate path-side NAS controller 31B receives the failure occurrence command from the MPU 33A of the normal path-side NAS controller 31A, it creates a retransmission command, and transmits this retransmission command to the host system 2 that transferred a data write request and data to be written, or a data read request to and from the normal path-side NAS controller 41A via the data controller 35B, network I/F unit 32B, network port 37BA, alternate path 24, switch ports 25E to 25H, switch device 21, switch ports 25A to 25D, connection path 22 and host port 12, respectively.

When the host system 2 receives the retransmission command from the MPU 33B of the alternate path-side NAS controller 31B, it transmits the data write request and data to be written, or the data read request transferred to and from the normal path-side NAS controller 31A to the network I/F unit 32B of the alternate path-side NAS controller 31B via the host port 12, connection path 22, switch ports 25A to 25D, switch device 21, switch ports 25E to 25H, alternate path 24 and network port 37BA, respectively.

And, as a result of the MPU 33B of the alternate path-side NAS controller 31B, channel controller 42B of the alternate path-side disk controller 41B, and disk controller 43B executing the same processing as the foregoing MPU 33A of the normal path-side NAS controller 31A, channel controller 42A of the normal path-side disk controller 41A, and disk controller 43A, they write the data to be written in the address position of the corresponding hard disk 51 of the storage apparatus 50, create a data write request complete command, and transmit this data write request complete command to the host system 2 that transmitted the data write request.

Moreover, the MPU 33B of the alternate path-side NAS controller 31B, channel controller 42B of the alternate path-side disk controller 41B, and disk controller 43B transmit the data to be read to the host system 2 that transmitted the read request and transmit this data read request complete command to the host system 2 via the data controller 36A, network I/F unit 32A, network port 37AA, normal path 23, switch ports 25E to 25H, switch device 21, switch ports 25A to 25D, connection path 22 and host port 12, respectively.

With the storage system 1, since the disk array device 3 is connected to the host system 2 via the normal path 23 and alternate path 24 as described above, even when a failure occurs in the normal path 23, data can be transmitted and received to and from the host system 2 via the alternate path 24. Further, in the foregoing case, in addition to a case where a failure occurs in the normal path 23, even in a case when a failure occurs in the normal path-side NAS controller 31A or the normal path-side disk controller 41A, data can be transmitted and received to and from the host system 2 via the alternate path 24.

Further, with the storage system 1, since the host system 2 recognizes the NAS controller 31A and NAS controller 31B as a single NAS server, the host system 2 can configured to be accessible without having to consider the IP address of the disk array device 3.

With the foregoing configuration, by the NAS controller 31B taking over the IP address of the NAS controller 31A when a failure occurs, the access path upon a failure can be switched without having to change the setting of the host system 2 (or the IP conversion server managing the IP address).

When adopting the foregoing configuration, since the host system 2 is not able to comprehend the IP address of the NAS controller 31B connected to the alternate path 24 if there is no failure in the normal path 23, it will not be possible for the host system 2 to conduct the path check of the alternate path 24.

In the present invention, as a result of the disk array device 3 performing the alternate path check processing with a host information table HT, when adopting the foregoing configuration, it will be possible to check the alternate path 24 before the path is switched from the normal path 23 to the alternate path 24.

(2) Alternate Path Check Processing

Next, the alternate path check processing in the storage system 1 is explained. The storage system 1 according to the present embodiment is configured such that it is able to check whether the alternate path 24 is able to transmit and receive data to and from the host system 2 upon acquiring setting information of the (accessed) host system 2 that received the data write request or data read request, and transmitting and receiving data to and from the host system 2 for a predetermined time or longer.

Thereby, when data is transmitted and received to and from the host system 2 for a predetermined time or longer, since it is considered that data will be continuously transmitted and received to and from the host system thereafter, it will be possible to reduce the possibility of a miss check caused by the suspension of the host system 2 (a miss check of erroneously determining that there is a path failure, even when a path failure has not occurred, because the communication between the host system 2 and the NAS controller 31B is disabled due to the suspension of the host system 2) upon checking the path failure between the host system 2 containing the alternate path 24 and the NAS controller 31B.

Further, when data is transmitted and received to and from the host system 2 for a predetermined time or longer, data that is transmitted and received to and from the host system 2 will be continuous and become a large quantity. Here, if the switching of the path to the alternate path 24 is not possible, there is a risk that the continuous, large quantity data will go to waste. Therefore, by adopting a configuration where a check is performed upon transmitting and receiving data for a predetermined time or longer, and additional effect of reducing such risk of can be yielded by performing a failure check when the risk is high.

Needless to say, the timing of conducting this check is not limited to a case of transmitting and receiving data to and from the host system 2 for a predetermined time or longer, and may be variously set according to the mode or various operations of the storage system 1.

In actuality, when the network I/F unit 32A receives the data write request or data read request from the host system 2, the MPU 33A of the normal path-side NAS controller 31A acquires the number of its NAS controller (normal path-side NAS controller 31A), the number of the network port 37AA that received the request, and the IP address and MAC address of the host system 2 that transmitted the request.

Further, the MPU 33A of the normal path-side NAS controller 31A is capable of measuring the time used in transmitting and receiving data to and from the host system 2, and, by acquiring a host access flag showing the status of the data transmission and reception with the host system 2 based on such measurement, it is further capable of creating the host information table HT together with the number of its NAS controller, the number of the network port 37AA, and the IP address and MAC address of the host system 2.

Figure 2:
FIG. 2 is a schematic diagram showing the configuration of a host information table.

In the foregoing case, FIG. 2 shows the host information table HT, and "0" bit to "3" bit of the "first" byte are used to store the data of the NAS controller number, "4" bit to "7" bit of the "first" byte are used to store the data of the network port 37AA number, "second" byte to "fifth" byte are used to store the IP address of the host system 2 that transmitted the data write request or data read request, "sixth" byte to "eleventh" byte are used to store the MAC address of the host system that transmitted the data write request or data read request, and "twelfth" byte is used to store the data of "0x00", for instance, when the time used for transmitting and receiving data to and from the host system 2 is less than 1 (minute), and to store the data of "0x01", for instance, when the time used for transmitting and receiving data to and from the host system 2 is more than 1 (minute).

And, the MPU 33A of the normal path-side NAS controller 31A stores the created host information table HT in the shared memory 45A via the data controller 35A, disk I/F unit 36A, channel controller 42A of the normal path-side disk controller 41A and data controller 46A, respectively.

Here, the MPU 33B of the alternate path-side NAS controller 31B is constantly monitoring the shared memory 45A, and when it detects that the host information table HT has been written in the shared memory 45A, or that the host access flag of the host information table HT has been updated, it copies this host information table HT to the shared memory 45B of the alternate path-side disk controller 41B.

Figure 3:
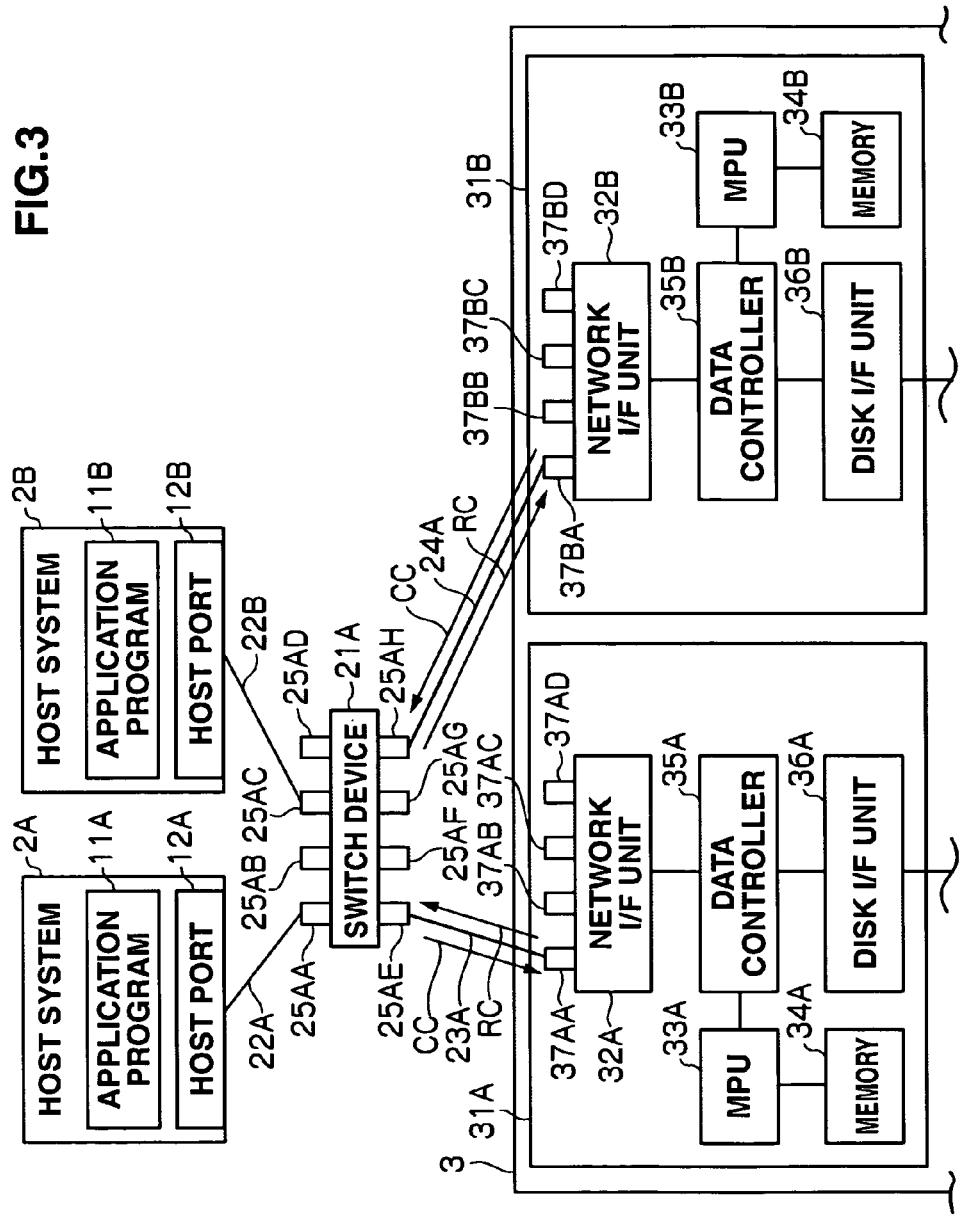
FIG. 3 is a conceptual diagram for explaining an alternate path check.

And, when the MPU 33B of the alternate path-side NAS controller 31B detects that the host access flag of the host information table HT has been updated to "0x01", it creates an alternate path check command CC, and transmits this alternate path check command CC, for example, as shown in FIG. 3, to the MPU 33A of the normal path-side NAS controller 31A via the data controller 35B, network I/F unit 32B, network port 37BA, alternate path 24A, switch port 25AH, switch device 21A, switch port 25AE, normal path 23A, network port 37AA, network I/F unit 32A and data controller 35A, respectively.

Incidentally, upon transmitting the alternate path check command CC, the MPU 33B of the alternate path-side NAS controller 31B acquires the IP address for transmitting the alternate path check command stored in the shared memory 45, and transmits the alternate path check command with the acquired IP address as the source IP address.

This processing, specifically, for example, is achieved by registering the acquired IP address in a server managing the network IP address, and transmitting the alternate path check command upon attaching the registered IP address thereto.

Incidentally, even in cases where the configuration has a plurality of network ports of the alternate path-side NAS controller 31A, by storing a single IP address for transmitting the alternate path check command stored in the shared memory 45, the respective network ports 37 of the alternate path-side NAS controller 31B will be able to transmit a check command with the IP address stored in the shared memory 45 as the source IP address upon conducting a path check.

When the MPU 33A of the normal path-side NAS controller 31A receives the alternate path check command CC, it creates a response command RC, and transmits this response command RC to the MPU 33B of the alternate path-side NAS controller 31B via the data controller 35A, network I/F unit 32A, network port 37AA, normal path 23A, switch port 25AE, switch device 21A, switch port 25AH, alternate path 24A, network port 37BA, network I/F unit 32B and data controller 35B, respectively.

As described above, when the MPU 33B of the alternate path-side NAS controller 31B detects that the host access flag of the host information table HT has been updated to "0x01", it creates an alternate path check command CC, transmits this alternate path check command CC to the MPU 33A of the normal path-side NAS controller 31A, and, by receiving a response command RC from the MPU 33A of the normal path-side NAS controller 31A, it is able to check in advance whether a path failure occurred in the alternate path 24.

Incidentally, in the foregoing case, as the types of path failure to be detected regarding the alternate path 24, for instance, trouble in the signal line of a cable used in the alternate path 24, an unstable defect caused by the partial disconnection in the signal line in such cable, a physical failure of the network port 37 mounted on the network I/F unit 32 of the NAS controller 31 and so on may be considered.

Nevertheless, as a result of the foregoing processing, since it is possible to check in advance whether data can be transmitted and received via the alternate path 24 among the MPU 33B of the NAS controller 31B and the switch device 21A and the MPU 33A of the NAS controller 31A, reliability of the alternate path 24 can be improved.

Figure 4:
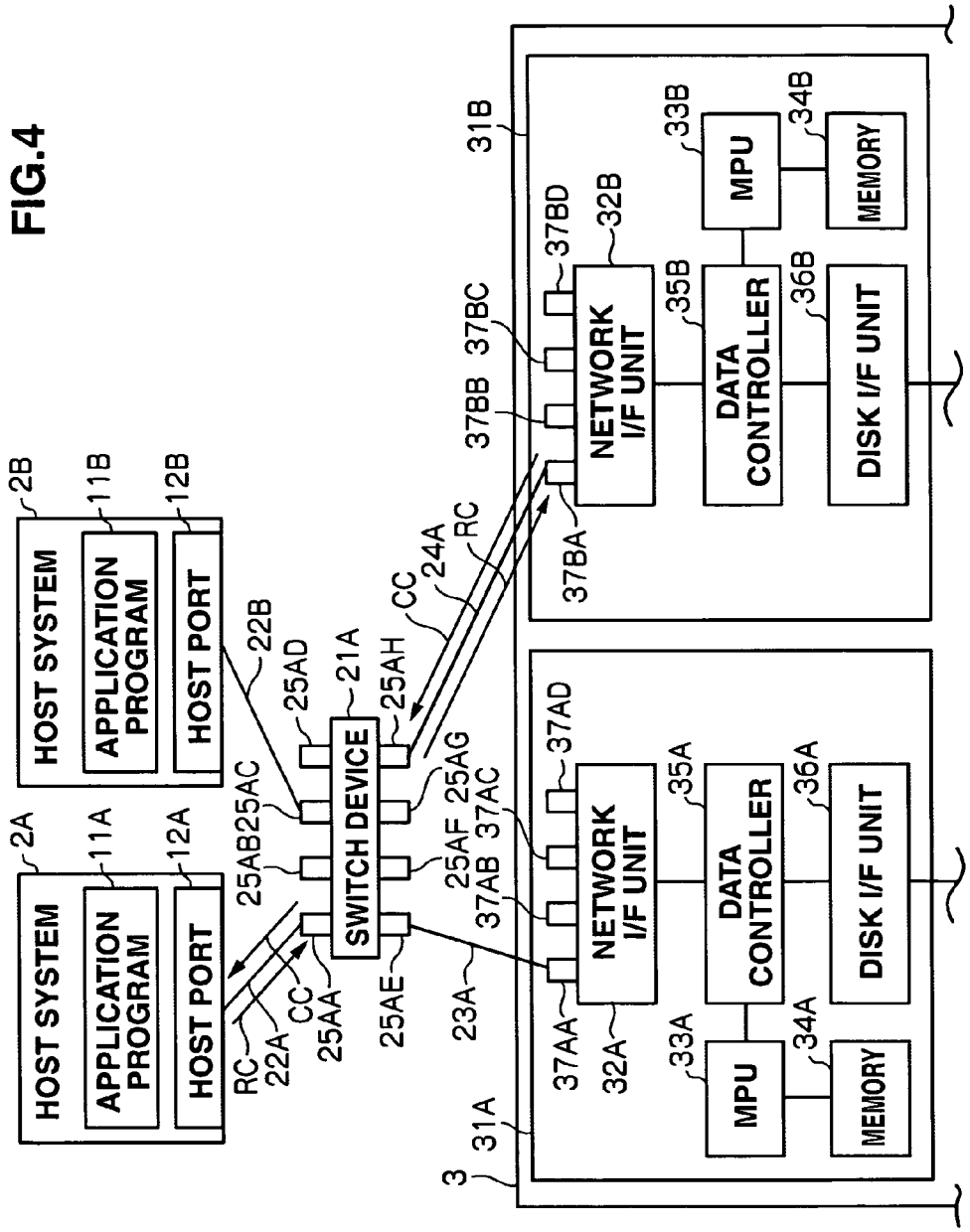
FIG. 4 is a conceptual diagram for explaining an alternate path check.

When the MPU 33B of the alternate path-side NAS controller 31B transmits the alternate path check command CC to the MPU 33A of the normal path-side NAS controller 31A, receives the response command RC from the MPU 33A of the normal path-side NAS controller 31A, and could not detect a failure in the alternate path 24, it may further create an alternate path check command CC, and transmit this alternate path check command CC, for instance, a shown in FIG. 4, to the host system 2 corresponding to the host information table HT in which the host access flag of the host information table HT was updated to "0x01" via the data controller 35B, network I/F unit 32B, network port 37BA, alternate path 24A, switch port 25AH, switch device 21A, switch port 25AA, connection path 22A and host port 12A, respectively.

When the host system 2A receives the alternate path check command CC, it creates a response command RC, and transmits this response command RC to the MPU 33B of the alternate path-side NAS controller 31B via the host port 12A, connection path 22A, switch port 25AA, switch device 21A, switch port 25AH, alternate path 24A, network port 37BA, network I/F unit 32B and data controller 35B, respectively.

As a result of performing the foregoing processing, it is possible to detect the communication failure between the host system 2 and the MPU 33B of the NAS controller 31B which could occur even in a case when a failure is not detected in the path among the MPU 33B of the NAS controller 31B and the switch device 21A and the MPU 33A of the NAS controller 31A as described above. As this kind of failure, for example, a zoning failure in the switch device 21A where the communication among the switch port 25AA and the switch device 21A and the switch port 25AH will become impossible may be considered.

As a result of this processing, since it will be possible to check in advance whether data can be transmitted and received between the host system 2 and the NAS controller 31B via the alternate path 24, when the path is switched from the normal path 23 to the alternate path 24 upon a failure, it will be possible to effectively prevent a situation of not being able to transmit and receive data to and from the host system 2 via the alternate path 24 from occurring.

Incidentally, by foremost conducting the path check among the MPU 33A of the NAS controller 31B and the switch device 21A and the MPU 33A of the NAS controller 31A, when there is a failure in the alternate path 24A, such failure can be detected without imposing burden on the host system 2.

Further still, if the setting information of the network ports 37AA to 37AD mounted on the network I/F unit 32A of the normal path-side NAS controller 31A is also stored in the shared memory 45A, a configuration of copying such setting information to the shared memory 45B can be adopted.

As described above, by respectively corresponding the network ports 37AA to 37AD mounted on the network I/F unit 32A of the normal path-side NAS controller 31A with the network ports 37BA to 37BD mounted on the network I/F unit 32B of the alternate path-side NAS controller 31B, it will also be possible to take on a configuration wherein, even when switching from the normal path-side NAS controller 31A to the alternate path-side NAS controller 31B upon a failure, the position of the network port 37 will not change, and the network ports 37BA to 37BD corresponding to the network port 37AA to 37AD will take over the transmission and reception of data to and from the host system 2.

Incidentally, a case may also be considered where the host information table HT stored in the shared memory 45 is created based on information input from the administrator via the management terminal 60 or the like prior to the path check. By transmitting a path check command from the disk array device 3 to the host system 2 based on the host information table HT, it will be possible to check whether a failure occurred in the communication path between the host system 2 and disk array device 3 regardless of the path being an alternate path 24 or a normal path 23.

In the foregoing case, since the disk array device is able to check the path failure, the processing load (issuing the path check command, confirming the response from the disk array device, managing information regarding whether there is a path failure, notifying the administrator upon the occurrence of a path failure and other matters) burdened on the host system for checking the path failure can be reduced without have to separately provide a network monitoring device.

Incidentally, in consideration of a case of not being able to receive a response command from the MPU 33A of the normal path-side NAS controller 31A or the host system 2 within a predetermined time (e.g., within 1 (minute)) due to an intermittent path failure, the MPU 33B of the alternate path-side NAS controller 31B is able to measure the number of times a response command could not be received from the MPU 33A of the normal path-side NAS controller 31A within a predetermined time (this is hereinafter referred to as the "number of response command non-receptions"), and a threshold value (e.g., 3 (times)) is set for the number of response command non-receptions.

And, until the number of response command non-receptions exceeds the set threshold value (e.g., 3 (times)), after the lapse of such predetermined time (e.g., 1 (minute), the MPU 33B of the alternate path-side NAS controller 31B transmits once again the alternate path check command CC to the MPU 33A of the normal path-side NAS controller 31A, or the host system 2 corresponding to the host information table HT in which the host access flag has been updated to "0x01".

Meanwhile, when the number of response command non-receptions exceeds the set threshold value (e.g., 3 (times)), the MPU 33B of the alternate path-side NAS controller 31B determines that some form of path failure has occurred in the alternate path 24, or the path between the host system 2 containing the alternate path 24 and the MPU 33B of the NAS controller 31B, creates a failure occurrence command, and transmits this to the management terminal 60 via the data controller 35B and disk I/F unit 36B, respectively.

And, the management terminal 60, for example, displays an error message on a display unit (not shown) of the management terminal 60 or emits a warning beep from a speaker (not shown) of the management terminal 60 in order to notify the user of the management terminal 60 that a path failure has occurred in the path of the alternate system including the alternate path 24.

Like this, when the MPU 33B of the alternate path-side NAS controller 31B determines that some form of path failure has occurred in the path of an alternate system including the alternate path 24, it is able to notify the user of the occurrence of a path failure in the path of an alternate system including the alternate path 24 by creating a failure occurrence command and transmitting this to the management terminal 60.

Meanwhile, as with the MPU 33B of the alternate path-side NAS controller 31B, in consideration of a case where the transmission and reception of data to and from the host system 2 is disconnected for over a predetermined time (e.g., 1 (minute) or more) due to an intermittent path failure, the MPU 33A of the normal path-side NAS controller 31A measures the number of times the transmission and reception of data with the host system 2 was disconnected (this is hereinafter referred to as the "number of data disconnections"), and a threshold value (e.g., 3 (times)) is set for the number of data disconnections. Until the number of data disconnections exceeds the set threshold value (e.g., 3 (times)), the MPU 33A of the normal path-side NAS controller 31A transmits a failure occurrence command to the host system 2 that is transmitting and receiving data, and transmits the data write request and data to be written, or the data read request transmitted and received to and from the normal path-side NAS controller 31A to the host system 2. Contrarily, when the number of data disconnections exceeds the threshold value (e.g., 3 (times)), the MPU 33A of the normal path-side NAS controller 31A determines that a failure occurred, and transmits the foregoing failure occurrence command to the MPU 33B of the alternate path-side NAS controller 31B.

When the NAS controller 31B receives the failure occurrence command of the normal paths 23, it performs processing for sending to the host system 2 or the switch device 21A the information for switching the path to be connected to the switch device 21A from the normal path 23A to the alternate path 24A.

In the foregoing case, when the MPU 33B of the alternate path-side NAS controller 31B receives the failure occurrence command from the MPU 33A of the normal path-side NAS controller 31A as described above and the path to be connected to the switch device 21A is switched to the alternate path 24A, for instance, a configuration may also be adopted where it turns off the threshold value setting of the number of response command non-receptions set to 3 (times), and does not detect the path failure in the alternate path 24 until the failure in the normal path 23 is corrected.

This is because, even if the detection of the path failure in the alternate path 24 for switching the path is conducted, the alternate path 24 is the only path that can be connected to the switch device 21A, and switching is not possible.

As a result, utilization of the CPU resource or the like for performing processing to detect the path failure can be suppressed, and the processing efficiency in accesses from the host can be improved. Or, after the path to be connected to the switch device 21A is switched to the alternate path 24A, the MPU 33B of the alternate path-side NAS controller 31B may adopt a configuration where it increases the number of data disconnections with the host system 2, for instance, to 5 times, and transmits the data write request and data to be written, or the data read request to the host system 2 up to 5 times even upon an intermittent path failure, or sets the threshold value of the number of response command non-receptions to 2 (times) in a value that is smaller than the threshold value of 5 times of the number of data disconnections, detects the path failure in the alternate path 24, transmits a notice to the management terminal 60 to the effect that a path failure has been determined in the case of such a failure, and urges the user of the management terminal 60 to switch the path immediately.

Further, when the number of response command non-receptions exceeds the set threshold value (e.g., 3 (times)) as described above, the MPU 33B of the alternate path-side NAS controller 31B transmits the failure occurrence command to the management terminal 60, and further transmits this failure occurrence command to the MPU 33A of the normal path-side NAS controller 31A via the data controller 35B, disk I/F unit 36B, channel controller 42B of the alternate path-side disk controller 41B, data controller 46B, data controller 46A of the normal path-side disk controller 41A, channel controller 42A, disk I/F unit 36A of the normal path-side NAS controller 31A and data controller 35A, respectively.

And, when the MPU 33A of the normal path-side NAS controller 31A receives the failure occurrence command from the MPU 33B of the alternate path-side NAS controller 31B, it determines that it is dangerous to switch to the alternate path 24, and, for example, turns off the threshold value setting of the number of data disconnections set to 3 (times), and does not detect the failure in the normal paths 23 until the path failure of the alternate path 24 is corrected.

In this case also, as when the path to be connected to the switch device 21A is switched to the alternate path 24 due to the occurrence of a failure in the normal path 23, the MPU 33A of the normal path-side NAS controller 31A may adopt a configuration where it increases the number of data disconnections with the host system 2, for instance, to 5 times, and transmits the data write request and data to be written, or the data read request to the host system 2 up to 5 times even upon an intermittent path failure, or sets the threshold value of the number of response command non-receptions to 2 (times) in a value that is smaller than the threshold value of 5 times of the number of data disconnections, detects the path failure in the normal path 23, transmits a notice to the management terminal 60 to the effect that a path failure has been determined in the case of such a failure, and urges the user of the management terminal 60 to switch the path immediately.

Like this, the MPU 33A of the normal path-side NAS controller 31A and the MPU 33B of the alternate path-side NAS controller 31B turn off the threshold value setting to the failure in either the normal path or alternate path so that the status for enabling the transmission and reception of data to and from the host system 2 is constantly maintained in the normal path 23 or alternate path 24 in consideration of an intermittent failure, and prevents a situation of the path between the host system 2 being detected as a failure in both the normal path 23 and alternate path 24.

Incidentally, the MPU 33B of the alternate path-side NAS controller 31B, for each prescribed interval, creates an alternate path check command CC, and sequentially transmits this alternate path check command CC to the host system 2 corresponding to the host information table HT stored in the shared memory 45B of the alternate path-side disk controller 41B via the data controller 35B, network I/F unit 32B, network port 37B, alternate path 24, switch ports 25E to 25H, switch device 21, switch ports 25A to 25D, connection path 22 and host port 12, respectively.

In the foregoing case, if the alternate path check command CC is transmitted excessively, this will affect the transmission speed of the host system 2 and network 4. Thus, it is desirable to transmit the alternate path check command CC in appropriate intervals.

Further, it is necessary to give consideration to the setting of the time for transmitting the alternate path check command CC to the host system 2 corresponding to the host information table HT stored in the shared memory 45B so that the response command RC is reliably received from the host system 2 and the determination on whether a path failure occurred between an accessible host system 2 is completed during the period that the alternate path check command CC is transmitted to the host system 2 and the subsequent alternate path check command CC is transmitted to the host system 2.

Thus, with respect to the setting of the time for transmitting the alternate path check command CC to the host system 2 corresponding to the host information table HT stored in the shared memory 45B, the time from transmitting the alternate path check command CC to the host system 2 and then transmitting the subsequent alternate path check command CC to the same host system 2 (in other words, the interval for commencing the determination on whether a path failure has occurred between the host system 2) is decided as follows.

Foremost, regarding the number of host systems 2 that can simultaneously access the disk array device 3, since the subset with the highest frequency of use is CLASS-C (in other words, 255 devices on the network), "255" is set as the maximum number for simultaneously accessing a single network port 37A on the network I/F unit 32A. Further, ordinarily, since there are "4" network ports 37A to be mounted on the network I/F unit 32A of the normal path-side NAS controller 31A, "4" is set as the number of network ports 37A to be mounted on the network I/F unit 32A of the normal path-side NAS controller 31A. Like this, when "255" is set as the maximum number for simultaneously accessing a single network port 37A on the network I/F unit 32A, and "4" is set as the number of network ports 37A to be mounted on the network I/F unit 32A of the normal path-side NAS controller 31A, the number of devices that can simultaneously access the disk array device 3 can be calculated with the following formula.

[Formula 1]

$$255(\text{devices}) \times 4(\text{ports}) = 1{,}020(\text{devices}) \quad (1)$$

Further, although it normally takes roughly 100(ms) for the MPU 33B of the alternate path-side NAS controller 31B to transmit the alternate path check command CC and then receive the response command RC, depending on the environment of the network 4, there are cases where it may take up to roughly 1 (second). Thus, "1" (second) is set as the time required for the MPU 33B of the alternate path-side NAS controller 31B to transmit the alternate path check command CC and then receive the response command RC.

Like this, when "1" (second) is set as the time required until receiving the response command RC, the interval for commencing the determination on whether a path failure occurred between the host system 2 and alternate path-side NAS controller 31B can be calculated with the following formula.

[Formula 2]

$$1{,}020(\text{devices}) \times 1(\text{second}) = 1{,}020(\text{seconds}) \quad (2)$$

And, if the preparatory time is set to 180 (seconds), the foregoing interval can be calculated with the following formula.

[Formula 3]

$$1{,}020(\text{seconds}) + 180(\text{seconds}) = 1{,}200(\text{seconds}) = 20 \text{ (minutes)} \quad (3)$$

Based on the above, the MPU 33B of the alternate path-side NAS controller 31B sets, as default, 20 (minutes) as the interval for commencing the determination on whether a path failure occurred between the host system 2, creates an alternate path check command CC every 20 (minutes), and sequentially transmits this alternate path check command CC to the host system 2 corresponding to the host information table HT stored in the shared memory 45B of the alternate path-side disk controller 41B via the data controller 35B, network I/F unit 32B, network port 37B, alternate path 24, switch ports 25E to 25H, switch device 21, switch ports 25A to 25D, connection path 22 and host port 12, respectively.

However, in order to be compatible with the expansion in the number of subset CLASSES and the network ports 37A to be mounted on the network I/F unit 32A of the normal path-side NAS controller 31A, the interval for commencing the determination on whether a path failure occurred between the host system 2 and the MPU 33B of the alternate path-side NAS controller 31B may be designed so that it can be changed. As a result, appropriate time can be selected according to the number of devices to be connected or the number of switch ports to be simultaneously used.

(3) Alternate Path Check Processing Sequence

Figure 5:
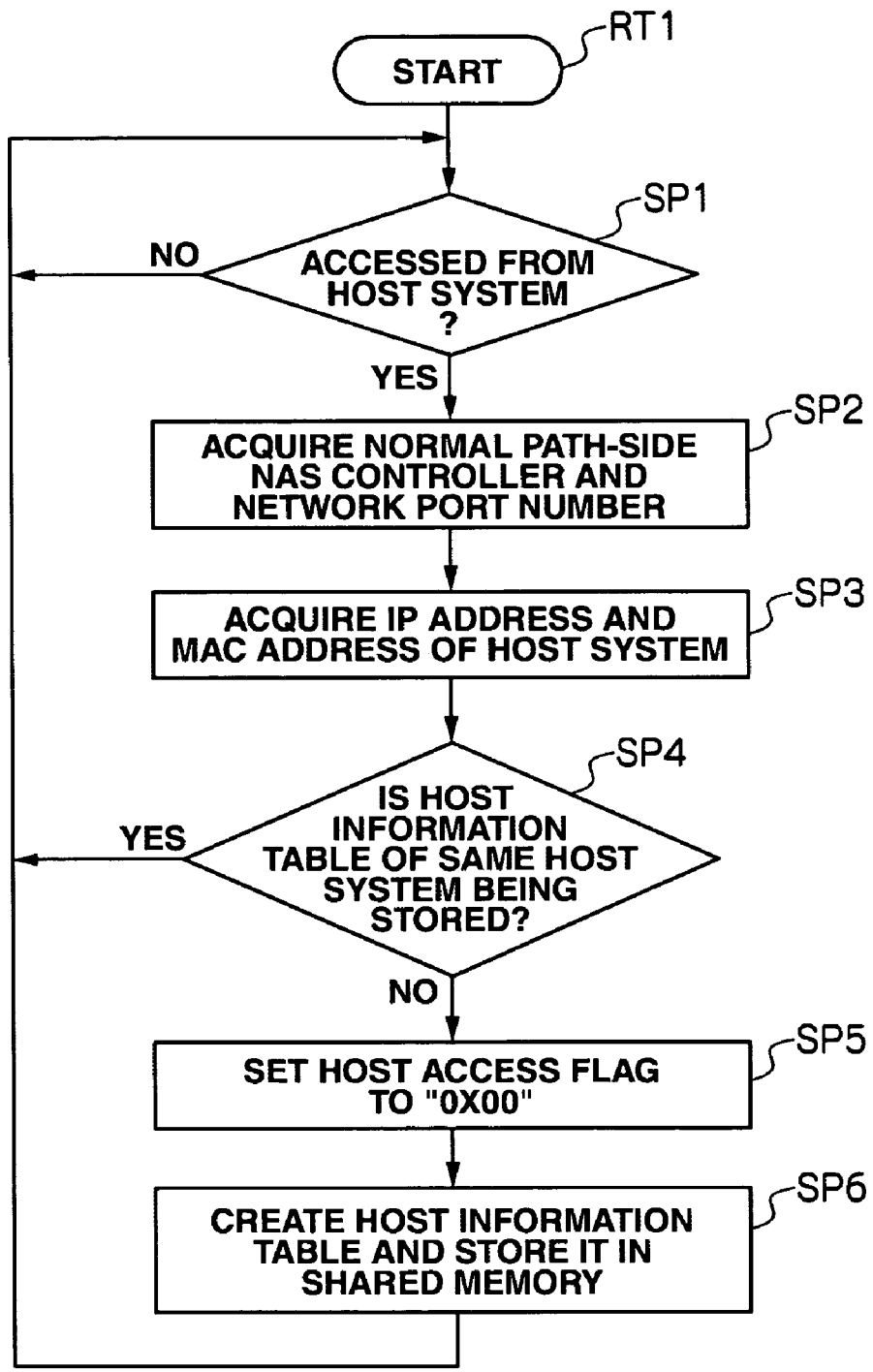
FIG. 5 is a flowchart for explaining the processing sequence for creating a host information table.

Next, the alternate path check processing to be performed in the storage system 1 is explained. FIG. 5 is a flowchart showing the specific processing sequence of the host information table creation processing to be performed for controlling the creation of the host information table HT.

The MPU 33A of the normal path-side NAS controller 31A, initially, according to the host information table creation processing sequence T1 shown in FIG. 5, waits in standby mode for the network I/F unit 32A to receive the data write request or data read request from the host system 2 (SP1).

Eventually, when the MPU 33A of the normal path-side NAS controller 31A receives the data write request or data read request from the host system 2 (SP1: YES), it acquires the number of its NAS controller (normal path-side NAS controller 31A), and the number of the network port 37A that received such request (SP2).

Next, the MPU 33A of the normal path-side NAS controller 31A acquires the IP address and MAC address of the host system 2 that transmitted the data write request or data read request (SP3).

Next, the MPU 33A of the normal path-side NAS controller 31A checks whether the host information table HT corresponding to the host system 2 of the acquired IP address and MAC address is stored in the shared memory 45A of the normal path-side disk controller 41A (SP4).

And, when the host information table HT corresponding to the host system 2 of the acquired IP address and MAC address is stored in the shared memory 45A of the normal path-side disk controller 41A (SP4: YES), the MPU 33A of the normal path-side NAS controller 31A once again returns to standby mode and waits for the network I/F unit 32A to receive the data write request or data read request from the host system 2 (SP1).

Meanwhile, when the host information table HT corresponding to the host system 2 of the acquired IP address and MAC address is not stored in the shared memory 45A of the normal path-side disk controller 41A (SP4: NO), the MPU 33A of the normal path-side NAS controller 31A, it sets the host access flag of the host information table HT to "0x00" (SP5).

Next, the MPU 33A of the normal path-side NAS controller 31A creates the number of its NAS controller (normal path-side NAS controller 31A), the number of the network port 37A that received such request, the IP address and MAC address of the host system 2 that transmitted the data write request or data read request and the host information table HT based on the host access flag, and stores these in the shared memory 45A of the normal path-side disk controller 41A (SP6).

And, the MPU 33A of the normal path-side NAS controller 31A thereafter once again returns to standby mode and waits for the network I/F unit 32A to receive the data write request or data read request from the host system 2 (SP1).

Figure 6:
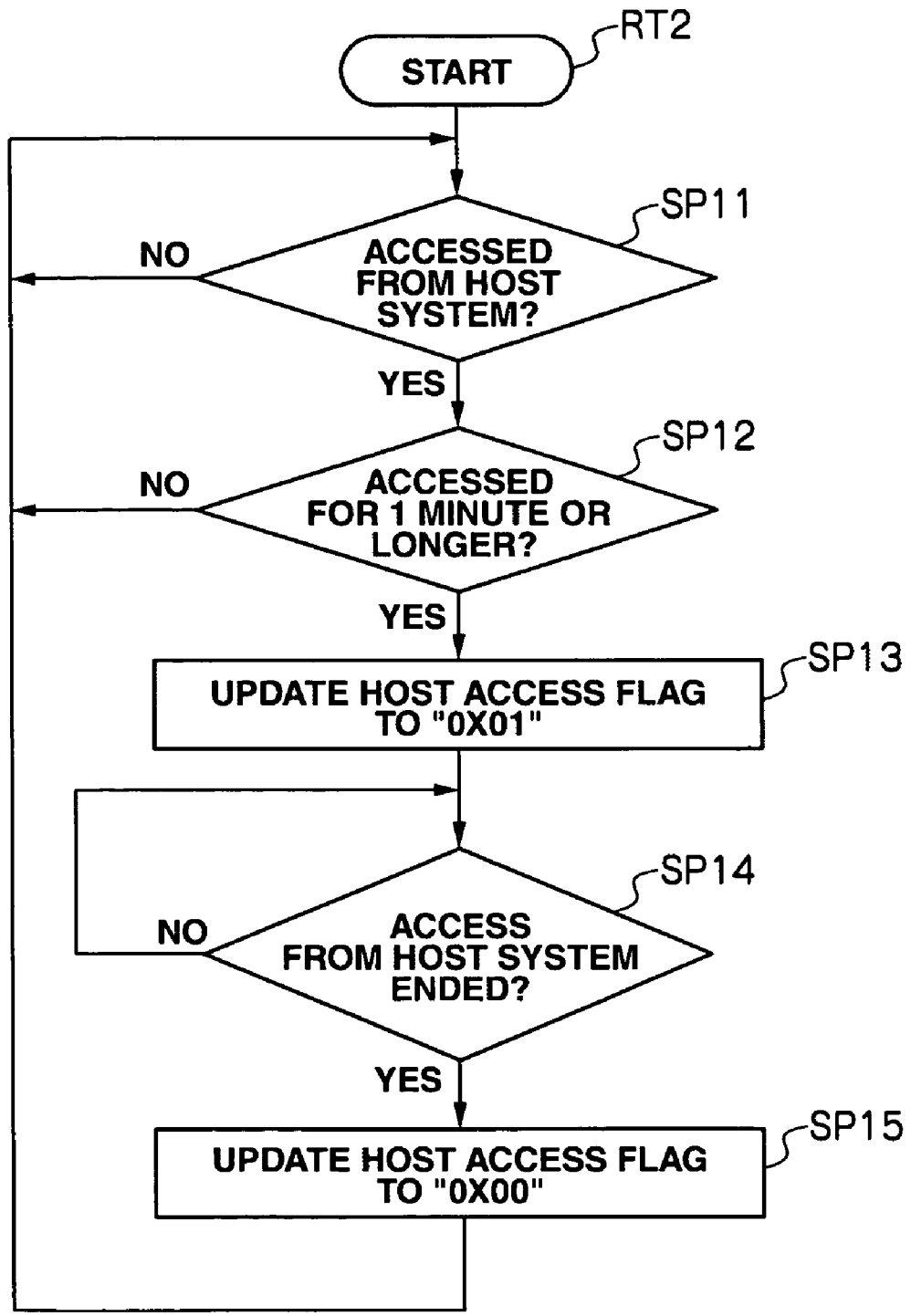
FIG. 6 is a flowchart for explaining the processing sequence for measuring the transmission and reception of data.

FIG. 6 is a flowchart showing the specific processing sequence of the data transmission/reception measurement processing for measuring the time used in the transmission and reception of data between the host system 2 and normal path-side NAS controller 31A.

The MPU 33A of the normal path-side NAS controller 31A, initially, according to the data transmission/reception measurement processing sequence T2 shown in FIG. 6, and waits in standby mode for the network I/F unit 32A to receive the data write request or data read request from the host system 2 (SP11).

Eventually, when the MPU 33A of the normal path-side NAS controller 31A receives the data write request or data read request from the host system 2 (SP11: YES), it waits in standby mode for the transmission and reception of data with the host system 2 to becomes 1 (minute) or longer (SP12).

Eventually, when the transmission and reception of data with the host system 2 to becomes 1 (minute) or longer (SP12: YES), the MPU 33A of the normal path-side NAS controller 31A updates the host access flag of the host information table HT stored in the shared memory 45A of the normal path-side disk controller 41A to "0x01" (SP13).

Next, the MPU 33A of the normal path-side NAS controller 31A waits in standby mode for the transmission and reception of data to and from the host system to end (SP14). Eventually, when the transmission and reception of data to and from the host system ends (SP14: YES), the MPU 33A of the normal path-side NAS controller 31A updates the host access flag of the host information table HT stored in the shared memory 45A of the normal path-side disk controller 41A to "0x00" (SP15).

And, the MPU 33A of the normal path-side NAS controller 31A thereafter once again returns to standby mode and waits for the network I/F unit 32A to receive the data write request or data read request from the host system 2 (SP11).

Figure 7:
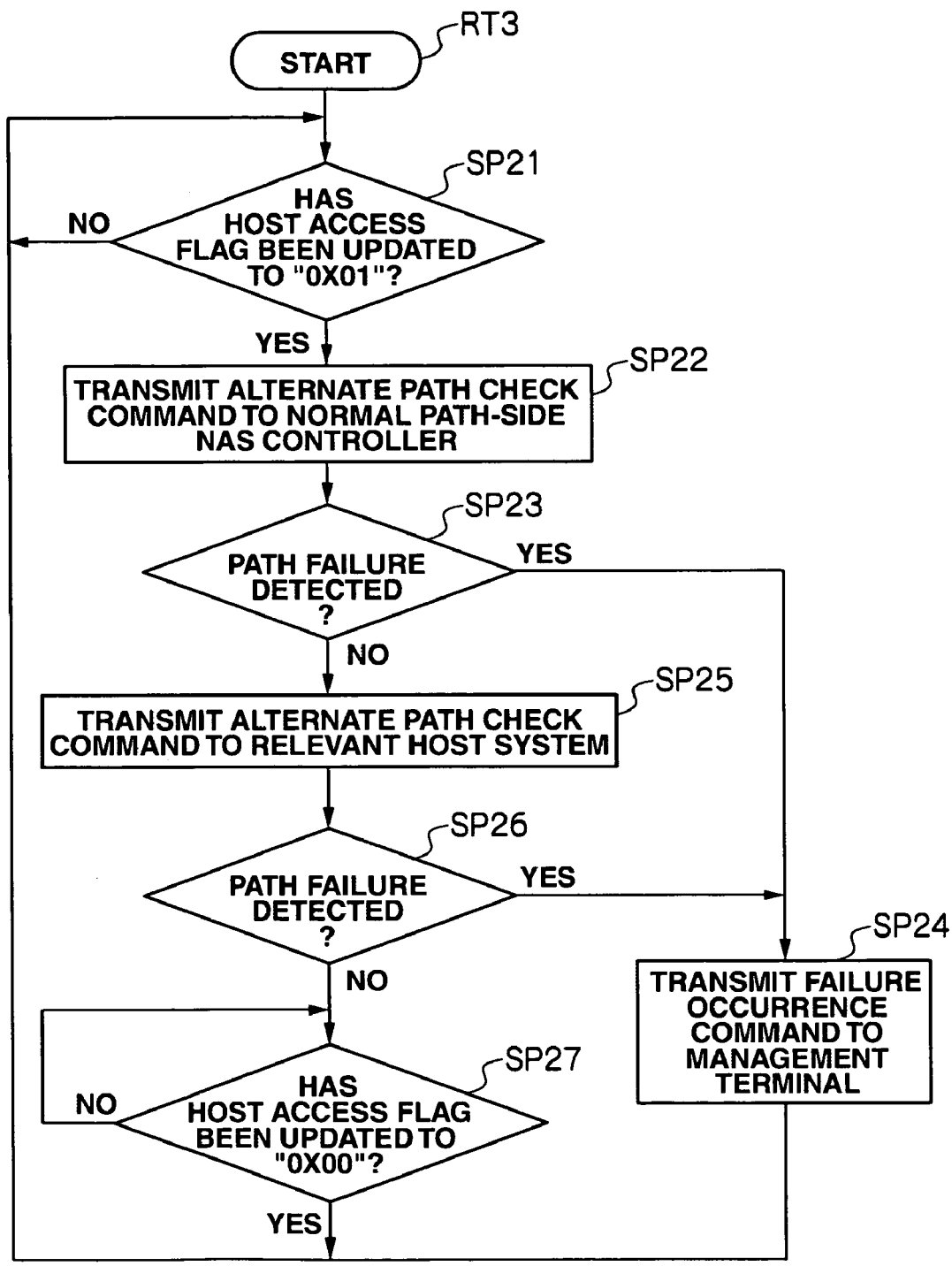
FIG. 7 is a flowchart for explaining the processing sequence for checking the alternate path.

FIG. 7 is a flowchart showing the specific processing sequence of the alternate path check processing for checking whether the alternate path 24 is able to transmit and receive data to and from the host system 2.

The MPU 33B of the alternate path-side NAS controller 31B, initially, according to the alternate path check processing sequence T3 shown in FIG. 7, waits in standby mode for the host access flag of the host information table HT stored in the shared memory 45B of the alternate path-side disk controller 41B to be updated to "0x01" (SP21).

Eventually, when the host access flag of the host information table HT stored in the shared memory 45B of the alternate path-side disk controller 41B is updated to "0x01" (SP21: YES), the MPU 33B of the alternate path-side NAS controller 31B creates an alternate path check command CC, and transmits this alternate path check command CC to the MPU 33A of the normal path-side NAS controller 31A (SP22).

Next, the MPU 33B of the alternate path-side NAS controller 31B checks whether some form of path failure occurred in the alternate path 24 (SP23). And, when some form of failure occurred in the alternate path 24 (SP23: YES), the MPU 33B of the alternate path-side NAS controller 31B creates a failure occurrence command, and transmits this failure occurrence command to the management terminal 60 (SP24), and once again returns to standby mode and waits for the host access flag of the host information table HT stored in the shared memory 45B of the alternate path-side disk controller 41B to be updated to "0x01" (SP21).

Contrarily, when a path failure has not occurred in the alternate path 24 (SP23: NO), the MPU 33B of the alternate path-side NAS controller 31B transmits [¾] to the host system 2 corresponding to the host information table HT in which the host access flag was updated to "0x01" (SP25).

Next, the MPU 33B of the alternate path-side NAS controller 31B checks whether some form of path failure occurred in the alternate path 24 (SP26). And, when some form of failure occurred in the alternate path 24 (SP26: YES), the MPU 33B of the alternate path-side NAS controller 31B creates a failure occurrence command, and transmits this failure occurrence command to the management terminal 60 (SP24), and once again returns to standby mode and waits for the host access flag of the host information table HT stored in the shared memory 45B of the alternate path-side disk controller 41B to be updated to "0x01" (SP21).

Contrarily, when a path failure has not occurred in the alternate path 24 (SP26: NO), the MPU 33B of the alternate path-side NAS controller 31B waits in standby mode for the host access flag of the host information table HT stored in the shared memory 45B of the alternate path-side disk controller 41B to be updated to "0x00" (SP27).

Eventually, when the host access flag of the host information table HT stored in the shared memory 45B of the alternate path-side disk controller 41B is updated to "0x00" (SP27: YES), the MPU 33B of the alternate path-side NAS controller 31B once again returns to standby mode and waits for the host access flag of the host information table HT stored in the shared memory 45B of the alternate path-side disk controller 41B to be updated to "0x01" (SP21).

Like this, with this storage system 1, when the MPU 33B of the alternate path-side NAS controller 31B detects that the host access flag of the host information table HT has been updated to "0x01", it is able to check in advance whether data can be transmitted and received to and from the host system 2 via the alternate path 24 by creating an alternate path check command CC, transmitting this alternate path check command CC to the MPU 33A of the normal path-side NAS controller 31A, and receiving a response command RC from the MPU 33A of the normal path-side NAS controller 31A, when the path is switched from the normal path 23 to the alternate path 24 upon a failure, it will be possible to effectively prevent a situation of not being able to transmit and receive data to and from the host system 2 via the alternate path 24 from occurring.

Figure 8:
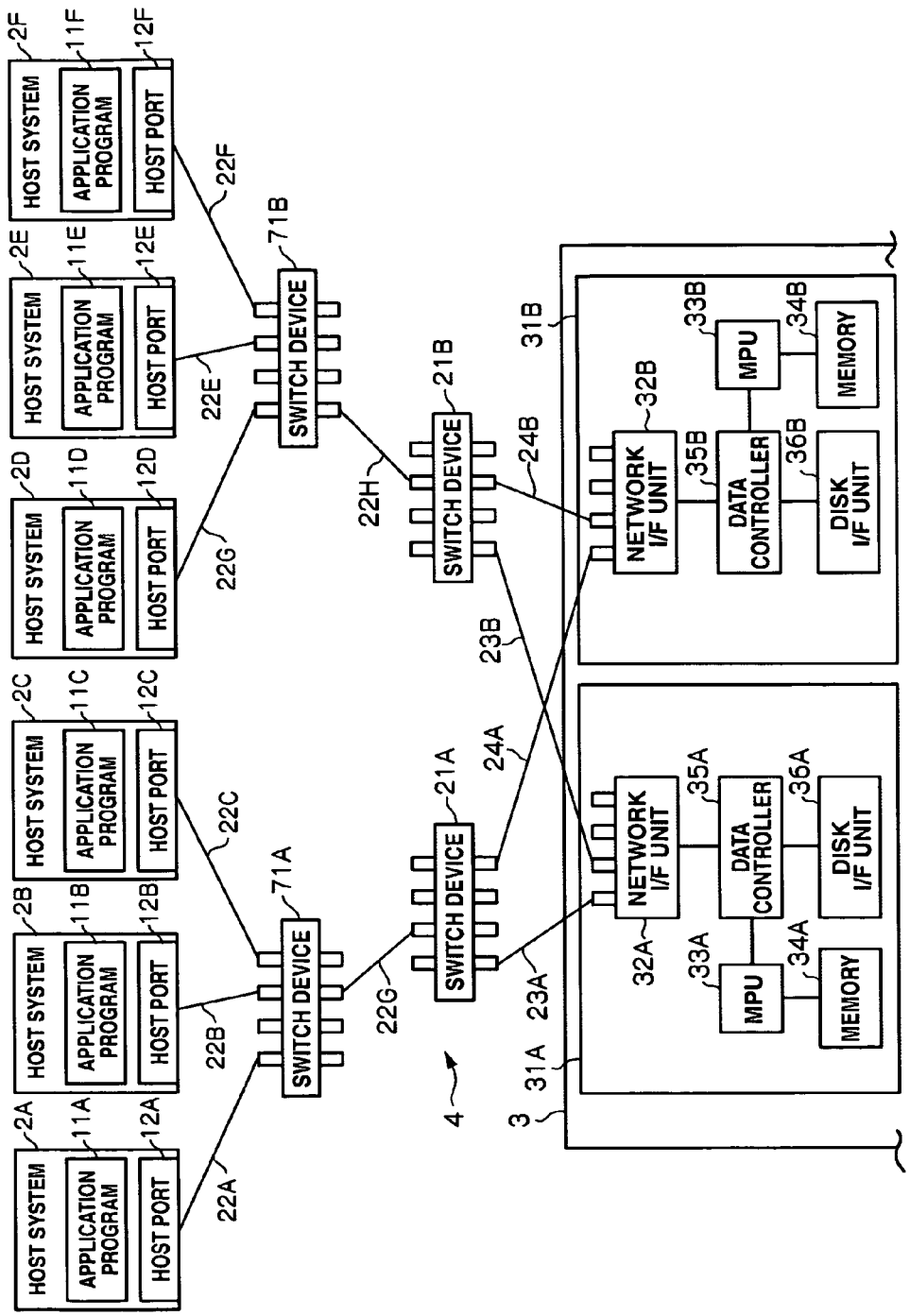
FIG. 8 is a schematic diagram showing the configuration of a storage system according to another embodiment.

Incidentally, in the present embodiment, although a case was explained where the host system 2 and switch device 21 are connected, the present invention is not limited thereto, and, for instance, as shown in FIG. 8, the host system 2 and switch device 71 may be connected, and the switch device 71 and switch device 21 may be connected, and may otherwise be employed in a network configuration containing various types of switch devices.

Further, in the present embodiment, the foregoing network configuration may also adopt a design where a network repeater such as a router is used instead of the switch device 21. Incidentally, the paths 22, 23 in the present embodiment are specifically anticipated to be configured with a network cable such as a LAN cable or the like.

Further, in the present embodiment, although a case was explained where the NAS controller 31 is provided separately from the disk controller 41, the present invention is not limited thereto, and, for example, the NAS controller 31 may be formed integrally with the disk controller 41 in order to provide the disk controller with a NAS function.

Further, in the present embodiment, although a case was explained where the disk controller 41 is equipped with the channel controller 42, disk controller 43, cache memory 44, shared memory 45 and data controller 46, the present invention is not limited thereto, and, in order to ensure the reliability of the disk controller, the channel controller 35 and disk controller 36 may be provided redundantly by duplicating such controllers, and may otherwise employ the configuration of various disk controllers.

Further, in the present embodiment described above, although a case was explained where the series of processing steps is executed with hardware having the respective functions, the present invention is not limited thereto, and such processing steps may also be executed with software. Here, when causing software to execute the series of processing steps, by installing various programs in a computer with built-in hardware dedicated to the programs constituting such software, it will be possible to execute the various functions, and, for instance, programs can be installed from a recording medium. As such a recording medium, for example, an optical disk, optical-magneto disk, semiconductor memory, magnetic disk or other types of recording mediums may be used as a matter of course. Moreover, for instance, various programs may be installed by downloading them via a network such as the Internet.

The present invention may be widely employed in various types of storage systems.

What is claimed is:

1. A disk array device comprising:
    a first control unit connected to a host system via a first path through which data is transmitted and received;
    a second control unit connected to said host system via a second path through which data is transmitted and received upon a failure;
    a memory that stores control information,
    wherein the control information comprises a flag, which indicates whether the time used in transmitting and receiving data to and from the host system is less than a first threshold value or whether the time used in transmitting and receiving data to and from the host system is greater than the first threshold value; and
    a storage apparatus that stores data transmitted from said host system,
    wherein said first control unit controls the transmission and reception of data between said host system and said storage apparatus conducted via said first path, and stores the control information used in the communication with said host system in said memory, and
    wherein said second control unit comprises:
        a transmission unit that transmits a command to said host system via said second path when the flag is updated to indicate that the time used in transmitting and receiving data to and from the host system is greater than the first threshold value,
        wherein said command is an alternate path check command that is issued to check whether the data can be transmitted and received between the host system and the second control unit via the second path; and
        a determination unit that determines whether a failure occurred in the communication between said second control unit and said host system based on a response to said command.

2. The disk array device according to claim 1, wherein said determination unit of said second control unit has a counter unit that counts the number of times a response was not provided to said command within a predetermined time, and determines that a failure occurred in the communication between said second control unit and said host system when the number counted by said counter unit exceeds a second threshold value.

3. The disk array device according to claim 1,
    wherein said first control unit comprises a measurement unit that measures the time used in transmitting and receiving data to and from said host system via said first path.

4. The disk array device according to claim 1, wherein said determination unit of said second control unit notifies an operation terminal operated by a user that a failure occurred when said determination unit determines that a failure occurred in the communication between said second control unit and said host system.

5. A disk array device comprising:
    a first control unit connected to a switch device, which is connected to a host system via a first path through which data is transmitted and received;
    a second control unit connected to said switch device via a second path through which data is transmitted and received upon a failure;
    a memory that stores control information,
    wherein the control information comprises a flag, which indicates whether the time used in transmitting and receiving data to and from the host system is less than a first threshold value or whether the time used in transmitting and receiving data to and from the host system is greater than the first threshold value; and
    a storage apparatus that stores data transmitted from said host system,
    wherein said second control unit comprises:
        a transmission unit that transmits a first command to said first control unit, via said second path, said switch device and said first path, when the flag is updated to indicate that the time used in transmitting and receiving data to and from the host system is greater than the first threshold values,
        wherein said first command is a first alternate path check command that is issued to check whether the data can be transmitted and received amongst the first control unit, the second control unit and the switch via the second path; and
        a determination unit that determines that a failure has not occurred in the communication between said second control unit and said switch device when there is a response to said first command,
    wherein said first control unit controls the transmission and reception of data between said host system and said storage apparatus conducted via said first path, and stores the control information used in the communication with said host system in said memory,
    wherein when there is a response to said first command and said determination unit determines that no failure has occurred in the communication between said second control unit and said switch device, and when the flag is updated to indicate that the time used in transmitting and receiving data to and from the host system is greater than the first threshold value, said transmission unit further transmits a second command to said host system via said second path and said switch device,
    wherein said second command is a second alternate path check command that is issued to check whether the data can be transmitted and received between the host system and the second control unit via the second path, and
    wherein said determination unit determines whether a failure occurred in the communication between said second control unit and said host system based on a response to said second command.

6. The disk array device according to claim 5, wherein said determination unit of said second control unit has a counter unit that counts the number of times a response was not provided to said first command within a predetermined time, and determines that a failure occurred in the communication between said second control unit and said switch device when the number counted by said counter unit exceeds a second threshold value.

7. The disk array device according to claim 5,
wherein said first control unit has a measurement unit that measures the time used in transmitting and receiving data to and from said host system via said first path, and
wherein said transmission unit of said second control unit transmits said first command to said switch device via said second path when the flag is updated to indicate that the time used in transmitting and receiving data to and from the host system is greater than the first threshold value.

8. The disk array device according to claim 5, wherein said determination unit of said second control unit notifies an operation terminal operated by a user that a failure occurred when said determination unit determines that a failure occurred in the communication between said second control unit and said switch device.

9. The disk array device according to claim 5,
wherein said first control unit comprises:
a first path counter unit that counts the number of times the transmission and reception of said data between said first control unit and said switch device conducted via said first path was discontinued over a predetermined time; and
a second determination unit that determines that a failure occurred in the communication between said first control unit and said switch device conducted via said first path when the number counted by said first path counter unit exceeds a second threshold value, and
wherein, when said second determination unit of said first control unit determines that a failure occurred in the communication between said first control unit and said switch device conducted via said first path, said data is transmitted and received via said second path.

10. The disk array device according to claim 9, wherein said first path counter unit of said first control unit does not count the number of times the transmission and reception of said data between said first control unit and said switch device conducted via said first path was discontinued over a predetermined time when it is determined that a failure occurred in the communication between said second control unit and said switch device conducted via said second path.

11. The disk array device according to claim 5, wherein said transmission unit of said second control unit transmits said first command and said second command to said switch device in predetermined intervals.

12. A path failure detection method of a disk array device, said disk array device comprising a first control unit connected to a host system via a first path through which data is transmitted and received, a second control unit connected to said host system via a second path through which data is transmitted and received upon a failure, a memory storing control information, and a storage apparatus storing data transmitted from said host system, said method comprising:
a first step of storing control information used in the communication between said first control unit and said host system in said memory,
wherein the control information comprises a flag, which indicates whether the time used in transmitting and receiving data to and from the host system is less than a first threshold value or whether the time used in transmitting and receiving data to and from the host system is greater than the first threshold value;
a second step of transmitting a command to said host system via said second path when the flag is updated to indicate that the time used in transmitting and receiving data to and from the host system is greater than the first threshold value,
wherein said command is an alternate path check command that is issued to check whether the data can be transmitted and received between the host system and the second control unit via the second path; and
a third step of determining whether a failure occurred in the communication between said second control unit and said host system based on a response to the command transmitted in said second step.

13. The path failure detection method according to claim 12, wherein said third step further comprises:
determining whether a failure occurred in the communication between said second control unit and said host system based on whether there was a response to said command within a predetermined time.

14. The path failure detection method according to claim 13, wherein said third step further comprises:
counting the number of times a response was not provided to said command within a predetermined time; and
determining that a failure occurred in the communication between said second control unit and said host system when said number exceeds a second threshold value.

15. The path failure detection method according to claim 12,
wherein said first step further comprises measuring the time used in transmitting and receiving data to and from said host system via said first path.

16. A path failure detection method of a disk array device, said disk array device comprising a first control unit connected to a switch device, which is connected to a host system, via a first path through which data is transmitted and received, a second control unit connected to said switch device via a second path through which data is transmitted and received upon a failure, a memory storing control information, and a storage apparatus storing data transmitted from said host system, said method comprising:
a first step of storing control information used in the communication between said first control unit and said host system in said memory,
wherein the control information comprises a flag, which indicates whether the time used in transmitting and receiving data to and from the host system is less than a threshold value or whether the time used in transmitting and receiving data to and from the host system is greater than the threshold value;
a second step of transmitting a first command to said first control unit, via said second path, said switch device and said first path, when the flag is updated to indicate that the time used in transmitting and receiving data to and from the host system is greater than the threshold value,
wherein said first command is a first alternate path check command that is issued to check whether the data can be transmitted and received amongst the first control unit, the second control unit and the switch via the second path;
a third step of determining whether a failure occurred in the communication between said second control unit and said switch device based on a response to said first command;
a fourth step of transmitting a second command to said host system via said second path and said switch device, when it is determined that a failure has not occurred in the communication between said second control unit and said switch device in said third step, and when the flag is updated to indicate that the time used in transmitting and receiving data to and from the host system is greater than the threshold value, wherein said second command is a second alternate path check command that is issued to check whether the data can be transmitted and received between the host system and the second control unit via the second path; and a fifth step of determining whether a failure occurred in the communication between said second control unit and said host system based on a response to said second command transmitted at said fourth step.

* * * * *